(12) United States Patent
Iwai et al.

(10) Patent No.: US 10,624,046 B2
(45) Date of Patent: *Apr. 14, 2020

(54) RADIO COMMUNICATION APPARATUSES AND RADIO COMMUNICATION METHOD

(71) Applicant: Sun Patent Trust, New York, NY (US)

(72) Inventors: Takashi Iwai, Ishikawa (JP); Akihiko Nishio, Osaka (JP); Daichi Imamura, Kanagawa (JP); Yoshihiko Ogawa, Kanagawa (JP); Atsushi Matsumoto, Ishikawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,690

(22) Filed: Mar. 14, 2019

(65) Prior Publication Data

US 2019/0215786 A1  Jul. 11, 2019

Related U.S. Application Data

(63) Continuation of application No. 15/716,256, filed on Sep. 26, 2017, now Pat. No. 10,278,140, which is a
(Continued)

(30) Foreign Application Priority Data

Jun. 26, 2009  (JP) ................ 2009-152647

(51) Int. Cl.
    *H04W 52/36* (2009.01)
    *H04L 5/00* (2006.01)
    *H04W 72/04* (2009.01)

(52) U.S. Cl.
    CPC ......... *H04W 52/365* (2013.01); *H04L 5/0007* (2013.01); *H04L 5/0053* (2013.01); *H04W 72/0473* (2013.01)

(58) Field of Classification Search
    CPC . H04W 52/365; H04W 52/26; H04W 52/367; H04W 72/04; H04L 1/0025;
(Continued)

(56) References Cited

U.S. PATENT DOCUMENTS 8,345,563 B2   1/2013  Oshiba et al.
2004/0252658 A1*  12/2004  Hosein ........... H04W 52/04
                                    370/328
(Continued)

FOREIGN PATENT DOCUMENTS

CN      101272370 A    9/2008
JP      2008300991 A   12/2008

OTHER PUBLICATIONS

3GPP TS 36.213 V8.5.0, "Physical layer procedures," 3rd Generation Partnership Project, Technical Specification Group Radio Access Network, Evolved Universal Terrestrial Radio Access (E-UTRA), Release 8, Dec. 2008, 74 pages.
(Continued)

*Primary Examiner* — Jung Liu
(74) *Attorney, Agent, or Firm* — Seed IP Law Group LLP

(57) ABSTRACT

A radio communication apparatus is provided, which includes a receiver and a controller. The receiver, in operation, receives a first power headroom (PHR), which is obtained by subtracting a transmit power for a data channel from a maximum transmit power at a mobile station and which is transmitted from the mobile station, and receives a second PHR, which is obtained by subtracting the transmit power for the data channel and a transmit power for a control channel from the maximum transmit power at the mobile station and which is transmitted from the mobile station. The controller, in operation, selectively sets a simultaneous transmission of the data channel and the control channel in different frequency bands to be performed by the mobile station. When the data channel and the control channel are
(Continued)

simultaneously transmitted in different frequency bands from the mobile station, the second PHR is obtained and transmitted from the mobile station.

14 Claims, 14 Drawing Sheets

Related U.S. Application Data continuation of application No. 14/713,993, filed on May 15, 2015, now Pat. No. 9,807,708, which is a continuation of application No. 13/377,649, filed as application No. PCT/JP2010/004235 on Jun. 25, 2010, now Pat. No. 9,065,618.

(58) Field of Classification Search
CPC ... H04L 5/0035; H04L 5/0055; H04L 5/0057; H04L 12/2869; H04L 12/5695; H04L 47/00; H04L 47/70; H04L 47/78; H04L 47/821; H04L 47/827; Y02B 60/50
See application file for complete search history.

(56) References Cited

U.S. PATENT DOCUMENTS

| | | | |
|---|---|---|---|
| 2008/0186916 A1 | 8/2008 | Oshiba et al. | |
| 2009/0175187 A1* | 7/2009 | Jersenius | H04W 52/365 370/252 |
| 2009/0238136 A1* | 9/2009 | Sambhwani | H04W 52/286 370/329 |
| 2009/0286566 A1* | 11/2009 | Lindholm | H04W 52/10 455/522 |
| 2009/0318180 A1* | 12/2009 | Yi | H04W 52/365 455/522 |
| 2010/0098012 A1* | 4/2010 | Bala | H04L 5/001 370/329 |
| 2010/0158147 A1* | 6/2010 | Zhang | H04W 52/146 375/260 |
| 2010/0232382 A1* | 9/2010 | Gauvreau | H04W 72/02 370/329 |
| 2010/0273515 A1* | 10/2010 | Fabien | H04L 5/006 455/509 |
| 2010/0296470 A1* | 11/2010 | Heo | H04W 52/365 370/329 |
| 2011/0038271 A1* | 2/2011 | Shin | H04W 52/08 370/252 |
| 2011/0274092 A1* | 11/2011 | Liu | H04W 72/10 370/335 |
| 2012/0008524 A1* | 1/2012 | Amirijoo | H04W 24/10 370/252 |
| 2012/0046064 A1* | 2/2012 | Baldemair | H04L 5/0007 455/522 |
| 2012/0224535 A1 | 9/2012 | Kim et al. | |
| 2013/0107745 A1 | 5/2013 | Oshiba et al. | |

OTHER PUBLICATIONS

English Translation of Chinese Search Report dated Jul. 30, 2014, for corresponding CN Application No. 201080028541.5, 3 pages.
International Search Report for PCT/JP2010/004235, dated Aug. 10, 2010, 1 page.
Nokia Siemens Networks, Nokia Corporation, "Power headroom reporting for EUTRAN uplink," R1-080329, Agenda Item: 6.3.2, 3GPP TSG RAN WG1 #51bis Meeting, Seville, Spain, Jan. 14-18, 2008, 3 pages.
Panasonic, "ACK/NACK transmission schemes for carrier aggregation," R1-101255, 3GPP TSG RAN WG1 Meeting #60, San Francisco, California, USA, Feb. 22-26, 2010, 5 pages.
Samsung, "Concurrent PUSCH and PUCCH Transmissions," R1-090611, 3GPP TSG RAN WG1 Meeting #56, Athens, Greece, Feb. 9-13, 2009, 2 pages.
ZTE, "Uplink Control Channel Design for LTE-Advanced," R1-090078, 3GPP TSG RAN WG1 Meeting #55bis, Ljubljana, Slovenia, Jan. 12-16, 2009, 4 pages.

\* cited by examiner

RADIO COMMUNICATION APPARATUSES AND RADIO COMMUNICATION METHOD

BACKGROUND

Technical Field

The present invention relates to a radio communication apparatus and a radio communication method.

Description of the Related Art

In 3rd Generation Partnership Project Long-term Evolution (3GPP LTE), in the case where a data channel (physical uplink shared channel (PUSCH)) and a control channel (physical uplink control channel (PUCCH)) are transmitted in the same subframe, a mobile station multiplexes the two channels by time division multiplexing (TDM), as shown in FIG. 1. That is, data is punctured by control information such as an ACK or a NACK. By TDM multiplexing, it is possible to maintain single carrier characteristics and prevent increase of cubic metric (CM). On the other hand, because data is punctured, there is a problem that data reception performance deteriorates.

In an uplink channel of LTE-Advanced, which is an evolved version of 3GPP LTE, in the case where a PUSCH and a PUCCH are transmitted in the same subframe, a mobile station is expected to multiplex the two channels by frequency division multiplexing (FDM), as shown in FIG. 2. A mobile station transmits a PUSCH and a PUCCH at the same time by mapping the PUSCH and the PUCCH in different frequency bands. Because data is not punctured by FDM multiplexing, it is possible to prevent deterioration of reception performance. On the other hand, there is a problem that single carrier characteristics are not maintained and multicarrier transmission is performed, so that CM increases. When CM increases, the maximum transmission power that can be transmitted by a mobile station lowers, so that power head room (hereinafter referred to as "power head room (PHR)") of a mobile station located, for example, at the cell edge, becomes small, and it becomes not possible to set the transmission power required by a base station, lowering the reception performance of the base station significantly. PHR refers to the margin of transmission power of a mobile station or transmission power of a mobile station that can be increased.

A method of multiplexing a PUSCH and a PUCCH at a mobile station, that is, a method in which a base station controls whether to perform multiplexing by TDM (hereinafter referred to as "TDM transmission mode") or perform multiplexing by FDM (hereinafter referred to as "FDM transmission mode") based on the PHR of a mobile station, is under consideration (for example, see Non-Patent Literature 1). Specifically, in the case where the PHR of a mobile station is large (that is, the margin of transmission power is large), a base station applies the FDM transmission mode, which does not subject to the influence of increase of CM, so as to prevent deterioration of PUSCH reception performance. Further, in the case where the PHR of a mobile station is small (that is, the margin of transmission power is small), a base station applies the TDM transmission mode, so as to prevent increase of CM and prevent deterioration of PUSCH reception performance.

Non-Patent Literature 1 discloses that, in the case of applying the FDM transmission mode, it is necessary to preferentially ensure transmission power of a PUCCH, for which retransmission control processing is not performed so as to require higher quality, compared to a PUSCH. That is, in the FDM transmission mode, when setting the ratio of transmission power of a PUSCH to a PUCCH, transmission power of the PUCCH is ensured first, and transmission power of a PUSCH is set within the range of the remaining transmission power. By this means, it is possible to prevent deterioration of performance of a PUCCH, which requires higher quality.

Here, the definitions and methods of reporting of PHRs used in LTE will be described below. In LTE, as shown in FIG. 3, only PHR that is determined based on transmission power of a PUSCH as a reference, is defined. In LTE, a base station uses PHR to control the transmission bandwidth and the modulation and channel coding scheme (MCS) of a PUSCH of a mobile station. A base station can receive a PUSCH with a reception quality desired by the base station, by controlling the transmission bandwidth and MCS of a PUSCH of a mobile station so that transmission power of a PUSCH to be transmitted by a mobile station does not exceed the maximum transmission power of the mobile station.

Non-Patent Literature 2 discloses the definition of PHR and the transmission condition of PHR by equation 1.

$$\text{PHR\_pusch} = P\text{max} - P\text{pusch} \quad \text{(Equation 1)}$$

In equation 1, PHR_pusch is PHR [dB] based on a PUSCH, and Pmax is the maximum transmission power [dBm] of a mobile station. Ppusch of equation 1 is transmission power of a PUSCH and is defined by following equation 2.

$$P\text{pusch} = 10\log_{10}M + P_0 + \alpha \cdot PL + \Delta_{MCS} + f(\Delta_i) \quad \text{(Equation 2)}$$

In equation 2, M is the number of frequency resource blocks to be assigned, $P_0$ is a value [dBm] set from a base station, PL is a path loss level [dB] measured by a mobile station, $\alpha$ is a weighted coefficient to show the compensation rate of path loss, $\Delta_{MCS}$ is an offset depending on the MCS, and $f(\Delta_i)$ is a transmission power control value for which closed loop control is performed (for example, relative values of +3 dB or −1 dB) and is the result of addition including the past transmission power control value.

$P_0$, $\alpha$, and $\Delta_{MCS}$ are parameters to be reported from a base station to a mobile station, and are values that are known by a base station. On the other hand, PL and $f(\Delta_i)$ are values that cannot be known correctly by a base station. Although $f(\Delta_i)$ is a parameter to be reported from a base station to a mobile station, there is a case where a mobile station cannot receive that command (cannot detect a control channel (PDCCH)). Because a base station cannot determine whether or not a mobile station can correctly receive a command, once a mobile station fails to receive a transmission power control value from a base station, a discrepancy of recognition between the mobile station and the base station occurs. As described above, because a base station cannot know PHR of a mobile station correctly, PHR needs to be reported from a mobile station.

PHR is reported from a mobile station in a cycle determined by a base station in advance. PHR is reported as medium access control (MAC) information of transmission data by a PUSCH using six bits.

CITATION LIST

Non-Patent Literature

NPL 1
3GPP R1-090611, Samsung, "Concurrent PUSCH and PUCCH Transmissions"

NPL 2
3GPP TS36.213 V8.5.0 7.1.6.1 Resource allocation type 0, "Physical layer procedures (Release 8)"

BRIEF SUMMARY

Technical Problem

However, a base station cannot correctly switch from the TDM transmission mode to the FDM transmission mode, only by using the above-described PHR based on a PUSCH (hereinafter referred to as "PHR_pusch"). This is because, in the FDM transmission mode, a base station cannot control the transmission bandwidth and MCS of a PUSCH so that transmission power does not exceed the maximum transmission power of a mobile station, only by using PHR_pusch. This will be described below.

In the FDM transmission mode, as described above, it is necessary to preferentially ensure PUCCH transmission power. That is, it is necessary to control transmission power of a PUSCH, which is determined by controlling the transmission bandwidth and MCS of the PUSCH, within the range of PHR that is determined based on transmission power of a PUCCH as a reference (hereinafter referred to as "PHR_pucch").

When the transmission power of a PUSCH that is required by a base station exceeds PHR_pucch of a mobile station, transmission power required for concurrent transmission of a PUSCH and a PUCCH exceeds the maximum transmission power of the mobile station, so that the mobile station cannot transmit a PUSCH with the transmission power required by the base station. Therefore, it becomes not possible to receive a PUSCH with the desired reception quality assumed by the base station, lowering the reception performance of a PUSCH.

For this reason, it is desirable that PHR_pucch, in addition to PHR_pusch, is reported from a mobile station to a base station. However, in the case where PHR_pucch is simply reported in addition to PHR_pusch, signaling overhead doubles as shown in the sequence diagram of FIG. 4. Because PHR of LTE is reported per dB in the range of −23 to 40 dB, the amount of signaling required for one PHR is six bits, as shown in FIG. 4.

On the other hand, in LTE, transmission powers of a PUSCH and a PUCCH are controlled separately. Therefore, it is not possible to correctly determine PHR_pucch from PHR_pusch. Further, in the case of calculating PHR_pucch in a base station, there is a following problem.

PHR_pucch is defined by following equation 3. Further, Ppucch of equation 3 is transmission power of a PUCCH, and is defined by equation 4.

$$\text{PHR\_pucch} = P\text{max} - P\text{pucch} \quad \text{(Equation 3)}$$

$$P\text{pucch} = P_{0\_pucch} + \text{PL} + h + \Delta_{pucch} + g(\Delta_i) \quad \text{(Equation 4)}$$

In equation 4, $P_{0\_pucch}$ is a value [dBm] set by a base station, h and $\Delta_{pucch}$ are values determined depending on the transmission format of a PUCCH, and $g(\Delta_i)$ is a transmission power control value for which closed loop control is performed and is the result of addition including the past transmission power control value. Because PL is the result measured by a mobile station, a base station cannot know PL. Further, regarding $g(\Delta_i)$, as is the case with $f(\Delta_i)$ in equation 2, a base station cannot determine whether or not a mobile station could recognize a command correctly.

Therefore, if making a mobile station report PHR_pucch so that a base station can know PHR_pucch correctly, the amount of signaling increases. On the other hand, if the amount of signaling is suppressed, a base station cannot know PHR_pucch correctly, and in the FDM transmission mode, it is not possible to control the transmission power of a PUSCH within the range of PHR_pucch so that transmission power does not exceed the maximum transmission power of a mobile station.

It is therefore an object of the present invention to provide a radio communication apparatus and a radio communication method for making it possible to suppress increase of signaling overhead and correctly switch transmission modes of a PUSCH and a PUCCH, at the same time.

Solution to Problem

A radio communication apparatus according to the present invention employs a configuration to include: a trigger information report determination section that determines whether or not to report trigger information that induces switch of a time division multiplexing transmission mode and a frequency division multiplexing transmission mode, which are methods of multiplexing a shared channel and a control channel, to a communicating party apparatus; and a transmission section that transmits the trigger information to the communicating party apparatus, when the trigger information is determined to be transmitted.

A radio communication apparatus according to the present invention employs a configuration to include: a trigger information detection section that detects trigger information that induces switch of a time division multiplexing transmission mode and a frequency division multiplexing transmission mode, which are methods of multiplexing a shared channel and a control channel, from a signal transmitted from a communicating party apparatus; a transmission mode control section that switches a transmission mode to be used for next transmission by the communicating party apparatus, based on the detected trigger information; and a transmission section that transmits transmission mode order information that orders switch of the transmission mode, to the communicating party apparatus, when switching the transmission mode.

A radio communication method according to the present invention employs a configuration to include the methods of: determining whether or not to report trigger information that induces switch of a time division multiplexing transmission mode and a frequency division multiplexing transmission mode, which are methods of multiplexing a shared channel and a control channel, to a communicating party apparatus; and transmitting the trigger information to the communicating party apparatus, when the trigger information is determined to be transmitted.

A radio communication method according to the present invention employs a configuration to include the methods of: detecting trigger information that induces switch of a time division multiplexing transmission mode and a frequency division multiplexing transmission mode, which are methods of multiplexing a shared channel and a control channel, from a signal transmitted from a communicating party apparatus; switching a transmission mode to be used for next transmission by the communicating party apparatus, based on the detected trigger information; and transmitting transmission mode order information that orders switch of the transmission mode, to the communicating party apparatus, when switching the transmission mode.

Advantageous Effects of Invention

According to the present invention, it is possible to suppress increase of signaling overhead and correctly switch transmission modes of a PUSCH and a PUCCH at the same time.

DETAILED DESCRIPTION

Figure 1:
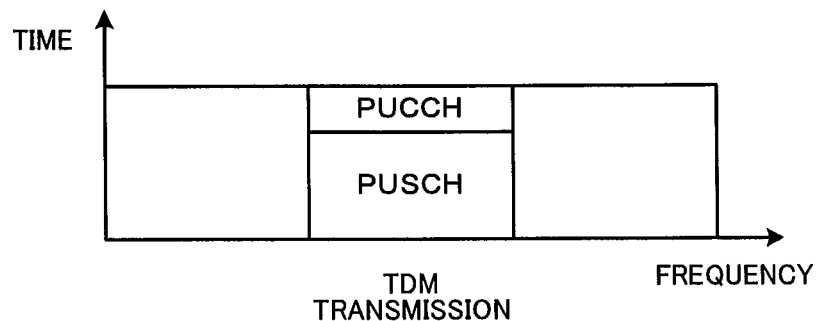
FIG. 1 shows a condition where a PUSCH and a PUCCH are TDM transmitted.
Figure 2:
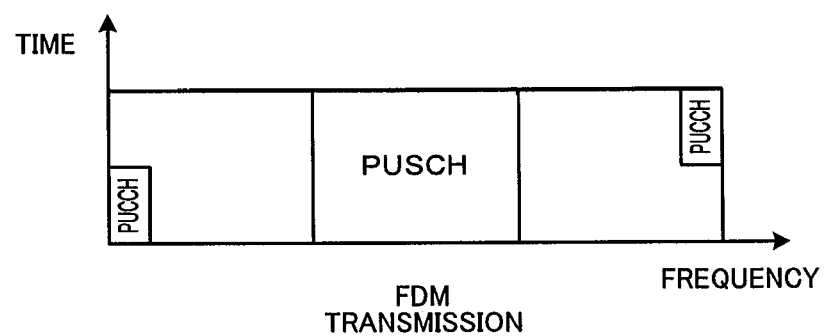
FIG. 2 shows a condition where a PUSCH and a PUCCH are FDM transmitted.
Figure 3:
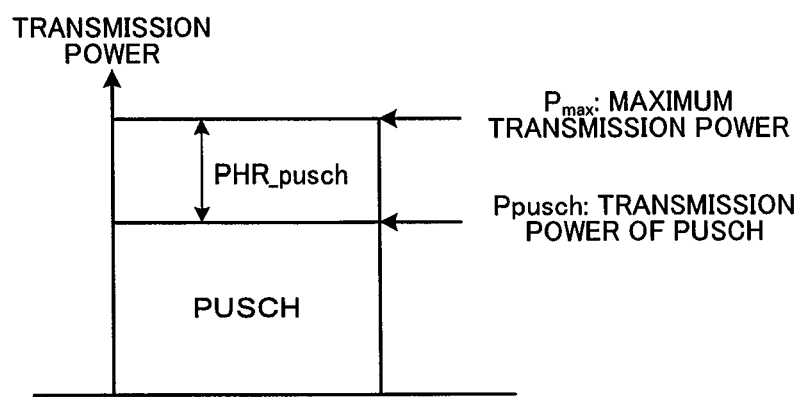
FIG. 3 shows PHR that is determined based on transmission power of a PUSCH as a reference.

Now, embodiments of the present invention will be described in detail with reference to the accompanying drawings. In embodiments, the same parts will be assigned the same reference numerals and overlapping explanations will be omitted.

Embodiment 1

Figure 5:
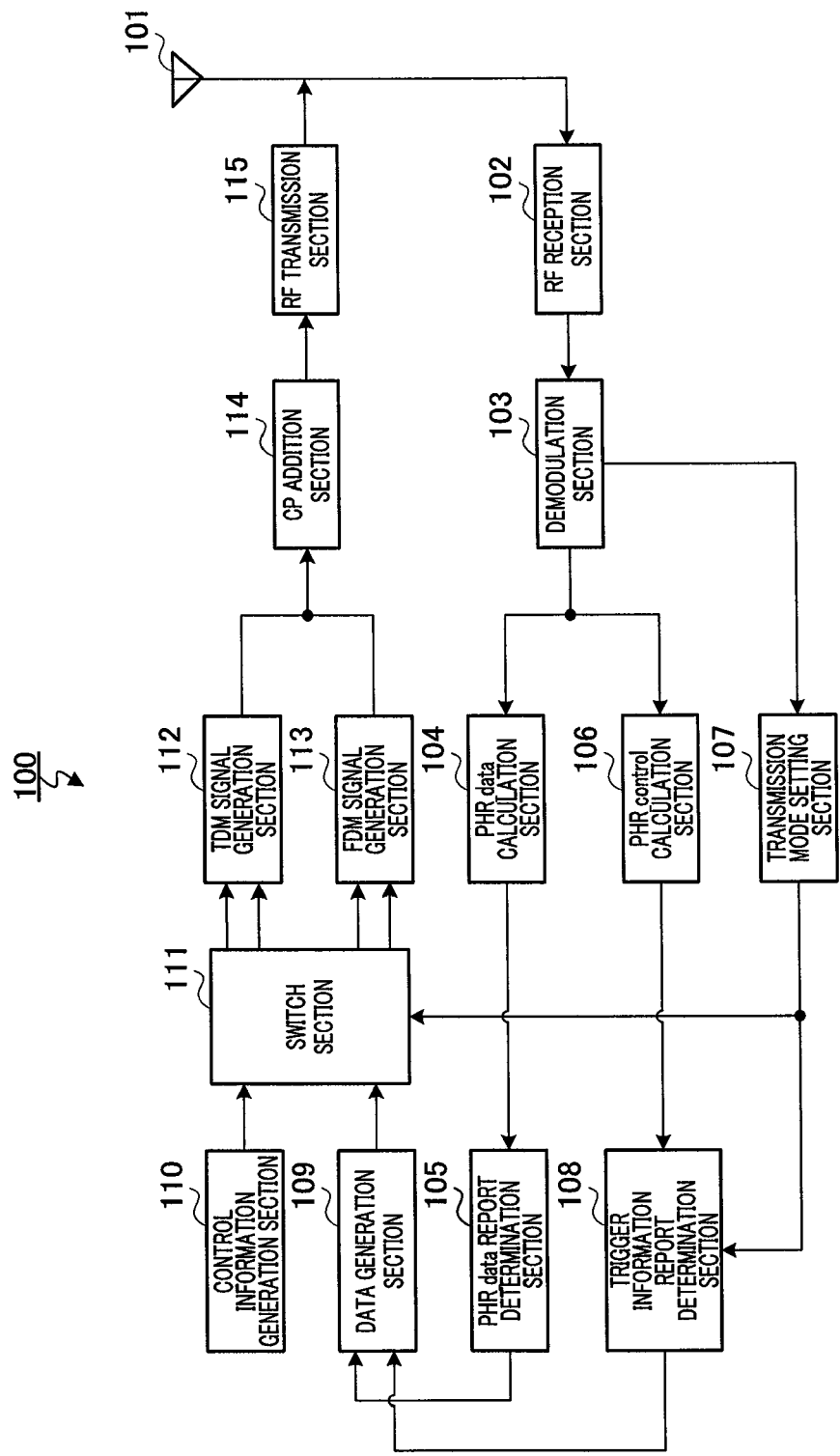
FIG. 5 is a block diagram showing a configuration of a mobile station according to Embodiment 1 of the present invention.

FIG. 5 shows a configuration of radio communication mobile station apparatus 100 (hereinafter simply referred to as "mobile station") according to Embodiment 1 of the present invention. In this figure, RF reception section 102 performs reception processing, such as down-conversion and A/D conversion, on a signal received via antenna 101, and outputs the reception-processed signal to demodulation section 103.

Demodulation section 103 demodulates scheduling information and a pilot signal that are contained in the reception signal output from RF reception section 102, and outputs the demodulated scheduling information to PHR_data calculation section 104, PHR_control calculation section 106, and transmission mode setting section 107. Further, demodulation section 103 outputs the demodulated pilot signal to PHR_data calculation section 104 and PHR_control calculation section 106.

PHR_data calculation section 104 calculates PHR_pusch (PHR based on a PUSCH) by performing calculation of equation 1 based on, for example, a path loss level measured using the downlink pilot signal output from demodulation section 103, the number of frequency resource blocks of a PUSCH, the MCS, and power control information of a PUSCH that are contained in the scheduling information output from demodulation section 103, and outputs the calculated PHR_pusch to PHR_data report determination section 105.

PHR_data report determination section 105 determines whether or not to report the PHR_pusch output from PHR_data calculation section 104, to a base station, based on cycle T [ms] determined by the base station in advance. That is, in the case where more than T [ms] has passed from the previous report of PHR_pusch, PHR_pusch will be reported, and in the case where more than T [ms] has not passed from the previous report of PHR_pusch, PHR_pusch will not be reported. Upon determining to report PHR_pusch, PHR_data report determination section 105 outputs PHR_pusch to data generation section 109.

PHR_control calculation section 106 calculates PHR_pucch (PHR based on a PUCCH) by performing calculation of equation 3, based on, for example, a path loss level measured using the downlink pilot signal output from demodulation section 103, and power control information of a PUCCH contained in the scheduling information output from demodulation section 103, and outputs the calculated PHR_pucch to trigger information report determination section 108.

Transmission mode setting section 107 detects a command of a method of multiplexing a PUSCH and a PUCCH (TDM transmission mode or FDM transmission mode) that is contained in the scheduling information output from demodulation section 103, and outputs the detection result to trigger information report determination section 108 and switch section 111.

Trigger information report determination section 108 compares which one of PHR_pucch output from PHR_control calculation section 106 and a predetermined threshold value is smaller or greater, i.e., comparison with a threshold value. Trigger information report determination section 108 determines whether or not to report trigger information, based on the result of the comparison with of a threshold value. Here, the condition of comparison with a threshold value is changed according to the transmission mode output from transmission mode setting section 107. Here, trigger information is PHR_pucch or flag information showing whether PHR_pucch is greater or smaller than a threshold value. As a result of the comparison with a threshold value, upon determining to report trigger information, trigger information report determination section 108 outputs trigger information to data generation section 109. Trigger information report determination section 108 will be described later.

Data generation section 109 generates data to be transmitted by mobile station 100. Further, upon receiving PHR_pusch output from PHR_data report determination section 105, or upon receiving PHR_pusch or trigger information output from trigger information report determination section 108, data generation section 109 generates data including that PHR_pusch or that trigger information, and outputs the generated data to switch section 111.

Control information generation section 110 generates control information (for example, CQI, or ACK or NACK information) to be transmitted by mobile station 100, and outputs the generated control information to switch section 111.

Switch section 111 switches whether to TDM transmit or FDM transmit the data output from data generation section 109 and the control information output from control information generation section 110, according to the command from transmission mode setting section 107. Upon receiving a command of the TDM transmission mode from transmission mode setting section 107, switch section 111 outputs the data and the control information to TDM signal generation section 112. On the other hand, upon receiving a command of FDM transmission from transmission mode setting section 107, switch section 111 outputs the data and the control information to FDM signal generation section 113.

TDM signal generation section 112 generates a TDM signal by time multiplexing the data and control information that are output from switch section 111, and outputs the TDM signal to CP addition section 114. TDM signal generation section 112 will be described in detail later.

FDM signal generation section 113 generates a FDM signal by frequency multiplexing the data and control information that are output from switch section 111, and outputs the FDM signal to CP addition section 114. FDM signal generation section 113 will be described in detail later.

CP addition section 114 copies part of the rear end of the signal output from TDM signal generation section 112 or FDM signal generation section 113, as a CP, and adds the CP to the front of that signal. The CP-added signal is output to RF transmission section 115.

RF transmission section 115 performs transmission processing, such as D/A conversion, amplification, and up-conversion, on the signal output from CP addition section 114, and transmits the transmission-processed signal to a base station from antenna 101.

Figure 6:
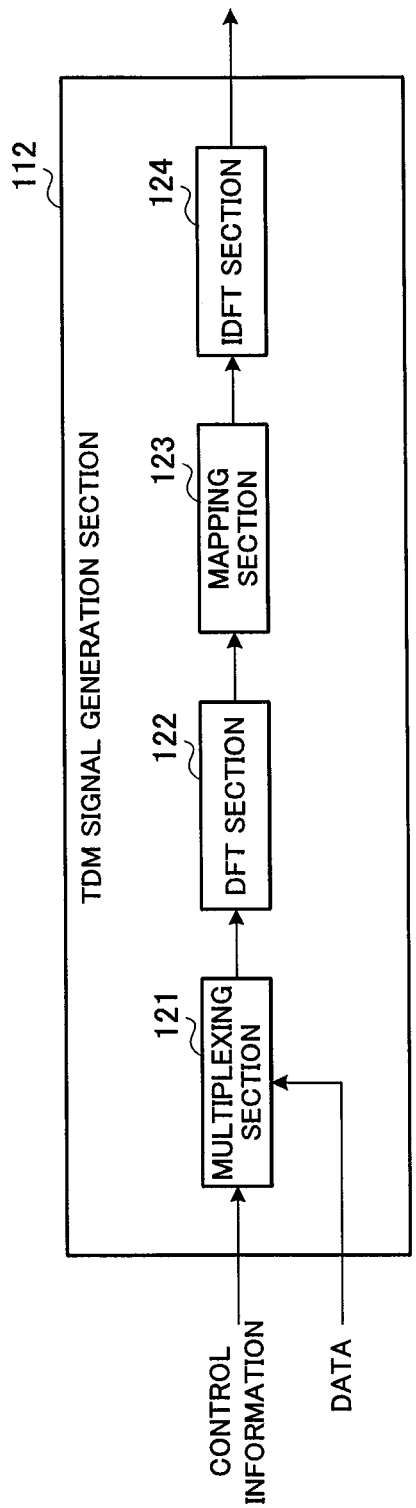
FIG. 6 is a block diagram showing an internal configuration of the TDM signal generation section shown in FIG. 5.

FIG. 6 is a block diagram showing an internal configuration of the TDM signal generation section 112 shown in FIG. 5. In this figure, multiplexing section 121 multiplexes the data and control information that are output from switch section 111 in the time domain, i.e., TDM multiplexes, and outputs the TDM-multiplexed signal to discrete fourier transform (DFT) section 122.

DFT section 122 performs DFT processing on the multiplexed signal output from multiplexing section 121 and outputs the DFT-processed multiplexed signal to mapping section 123.

Mapping section 123 maps the signal output from DFT section 122 on the frequency band scheduled by a base station, and outputs the mapped signal to inverse discrete fourier transform (IDFT) section 124.

IDFT section 124 performs IDFT processing on the frequency domain signal output from mapping section 123, converts the signal into a time domain signal, and outputs the time domain signal to CP addition section 114.

Figure 7:
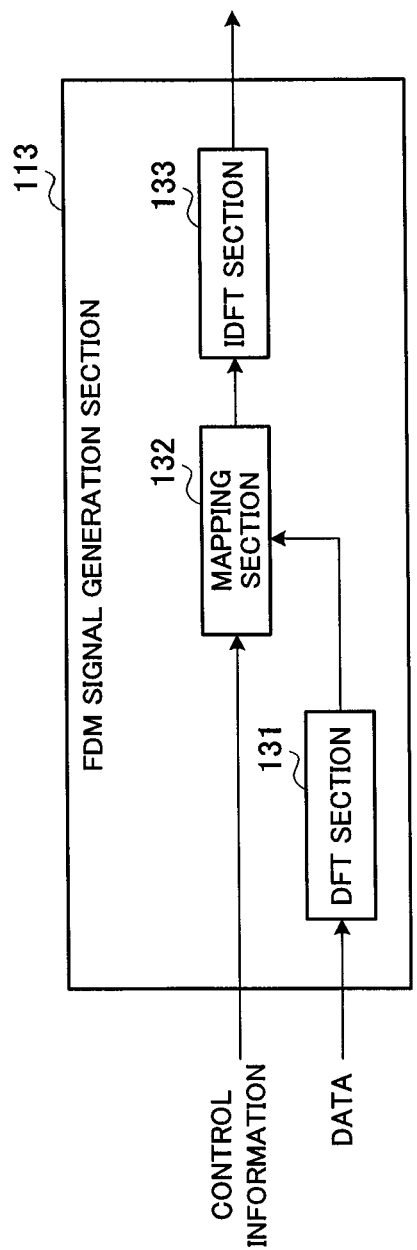
FIG. 7 is a block diagram showing an internal configuration of the FDM signal generation section shown in FIG. 5.

FIG. 7 is a block diagram showing an internal configuration of FDM signal generation section 113 shown in FIG. 5. In this figure, DFT section 131 performs DFT processing on the data output from switch section 111 and outputs the DFT-processed data to mapping section 132.

Mapping section 132 maps the data signal output from DFT section 131 and the control information output from switch section 111 on the frequency band scheduled by the base station, multiplexes the mapped data signal and control information in the frequency domain, i.e., FDM multiplexes, and outputs the FDM-multiplexed signal to IDFT section 133.

IDFT section 133 performs IDFT processing on the frequency domain signal output from mapping section 132, converts the signal into a time domain signal, and outputs the time domain signal to CP addition section 114.

Figure 8:
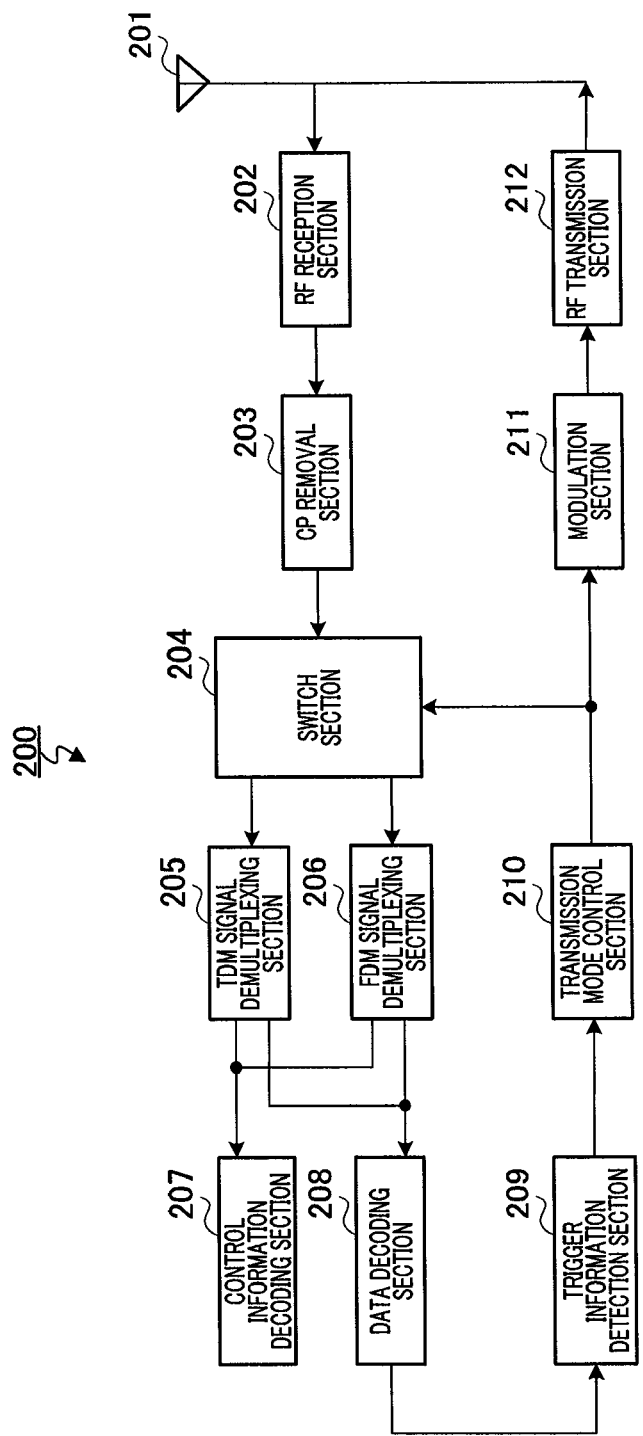
FIG. 8 is a block diagram showing a configuration of a base station according to Embodiment 1 of the present invention.

FIG. 8 is a block diagram showing a configuration of radio communication base station apparatus 200 (hereinafter simply referred to as "base station") according to Embodiment 1 of the present invention. In this figure, RF reception section 202 receives a signal transmitted from mobile station 100 via antenna 201, performs reception processing, such as down-conversion and A/D conversion, on the received signal, and outputs the reception-processed signal to CP removal section 203.

CP removal section 203 removes the CP of the signal output from RF reception section 202 and outputs the signal without a CP to switch section 204.

Switch section 204 switches whether to demultiplex the data and the control information in the time domain or demultiplex the data and the control information in the frequency domain, according to the transmission mode reported to mobile station 100. When having reported a command of TDM transmission mode to mobile station 100, switch section 204 outputs the signal without a CP to TDM signal demultiplexing section 205, and when having reported a command of FDM transmission mode to mobile station 100, switch section 204 outputs the signal without a CP to FDM signal demultiplexing section 206.

TDM signal demultiplexing section 205 demultiplexes the data and the control information in the time domain, and outputs the demultiplexed control information to control information decoding section 207 and outputs the demultiplexed data to data decoding section 208. TDM signal demultiplexing section 205 will be described in detail later.

FDM signal demultiplexing section 206 demultiplexes the data and the control information in the frequency domain, and outputs the demultiplexed control information to control information decoding section 207 and outputs the demultiplexed data to data decoding section 208. FDM signal demultiplexing section 206 will be described in detail later.

Control information decoding section 207 decodes the control information output from TDM signal demultiplexing section 205 or FDM signal demultiplexing section 206 to obtain the control information transmitted from mobile station 100.

Data decoding section 208 decodes the data output from TDM signal demultiplexing section 205 or FDM signal demultiplexing section 206, and outputs the decoded data to trigger information detection section 209.

Trigger information detection section 209 detects trigger information contained in the data output from data decoding section 208, and outputs the detected trigger information to transmission mode control section 210.

Transmission mode control section 210 determines to switch the method of multiplexing the data (PUSCH) and the control information (PUCCH) that are to be transmitted from mobile station 100, using the trigger information output from trigger information detection section 209. Upon change from the previous transmission mode, transmission mode control section 210 outputs transmission mode order information to switch section 204 and modulation section 211. Transmission mode control section 210 will be described in detail later.

Modulation section 211 modulates the transmission mode order information output from transmission mode control section 210, and outputs the modulated signal to RF transmission section 212.

RF transmission section 212 performs transmission processing, such as D/A conversion, amplification, and up-conversion, on the modulated signal output from modulation section 211, and transmits the transmission-processed signal to mobile station from antenna 201.

Figure 9:
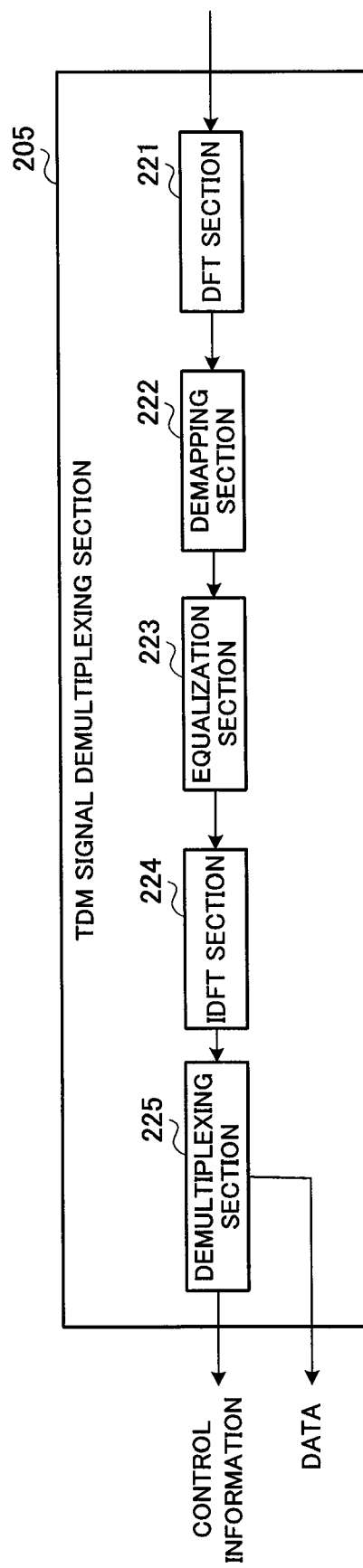
FIG. 9 is a block diagram showing an internal configuration of the TDM signal demultiplexing section shown in FIG. 8.

FIG. 9 is a block diagram showing an internal configuration of TDM signal demultiplexing section 205 shown in FIG. 8. In this figure, DFT section 221 performs DFT processing on the reception signal without a CP that is output from switch section 204, and outputs the signal converted from the time domain to the frequency domain, to demapping section 222.

Demapping section 222 extracts a reception signal of desired mobile station 100 from the frequency band scheduled by base station 200, out of the frequency domain signals output from DFT section 221, and outputs the extracted reception signal to equalization section 223.

Equalization section 223 calculates a channel estimation value from a pilot signal contained in the reception signal output from demapping section 222. Equalization section 223 performs equalization processing for correcting changes of the amplitude and the phase in the frequency domain that the reception signal output from demapping section 222 received in the channel, using the channel estimation value, and outputs the reception signal after equalization processing to IDFT section 224.

IDFT section 224 performs IDFT processing on the reception signal output from equalization section 223, converts the IDFT-processed reception signal into a time domain signal, and outputs the time domain signal to demultiplexing section 225.

Demultiplexing section 225 demultiplexes the reception signal output from IDFT section 224 into control information and data in the time domain, and outputs the demultiplexed control signal to control information decoding section 207 and outputs the demultiplexed data to data decoding section 208.

Figure 10:
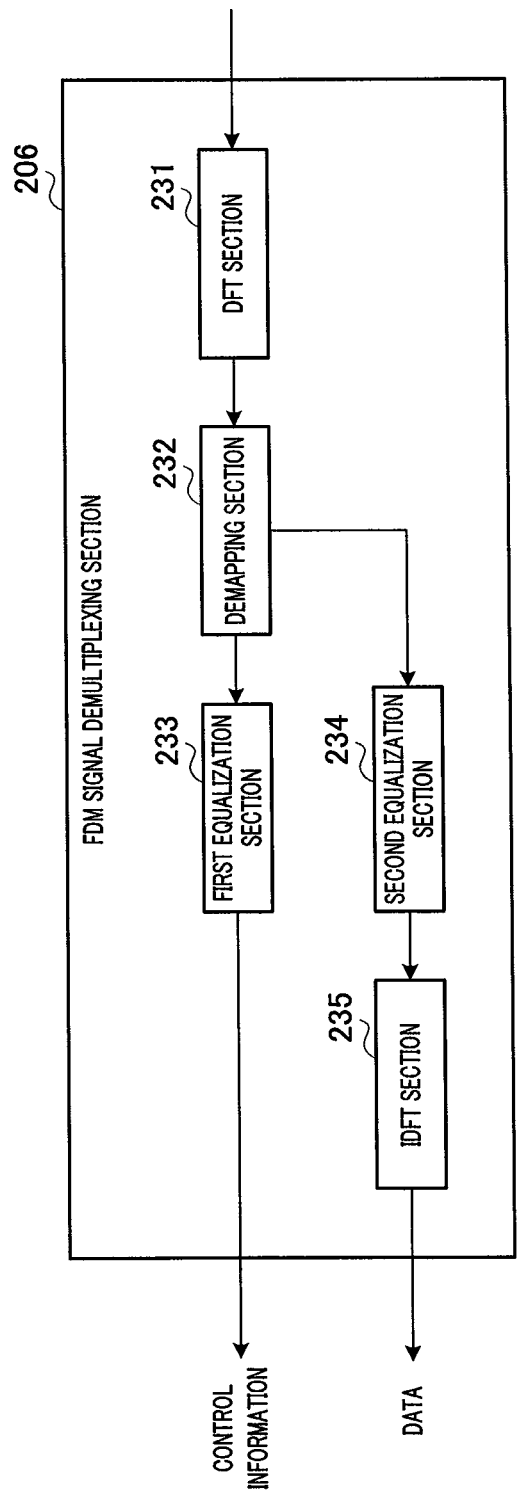
FIG. 10 is a block diagram showing an internal configuration of the FDM signal demultiplexing section shown in FIG. 8.

FIG. 10 is a block diagram showing an internal configuration of FDM signal demultiplexing section 206 shown in FIG. 8. In this figure, DFT section 231 performs DFT processing on the reception signal without a CP that is output from switch section 204, and outputs the signal converted from the time domain to the frequency domain, to demapping section 232.

Demapping section 232 extracts data and control information of a reception signal of desired mobile station 100 from the frequency band scheduled by base station 200, out of the frequency domain signals output from DFT section 231, and outputs the extracted data to first equalization section 233 and outputs the extracted control information to second equalization section 234.

First equalization section 233 calculates a channel estimation value from a pilot signal contained in the reception signal output from demapping section 232. First equalization section 233 performs equalization processing for correcting changes of the amplitude and the phase in the frequency domain that the control information output from demapping section 232 received in the channel, using the channel estimation value, and outputs the obtained control information to control information decoding section 207.

Second equalization section 234 calculates a channel estimation value from a pilot signal contained in the reception signal output from demapping section 232. Second equalization section 234 performs equalization processing for correcting changes of the amplitude and the phase in the frequency domain that the data output from demapping section 232 received in the channel, using the channel estimation value, and outputs the obtained data to IDFT section 235.

IDFT section 235 performs IDFT processing on the data output from second equalization section 234, converts the IDFT-processed data into a time domain signal, and outputs the time domain signal to data decoding section 208.

Next, trigger information report determination section 108 shown in FIG. 5 will be described in detail below. Trigger information report determination section 108 performs comparison with a threshold value with respect to PHR_pucch of mobile station 100 that is calculated by mobile station 100, to determine whether or not to report trigger information.

Specifically, in the TDM transmission mode, trigger information is reported when equation 5 is satisfied. X1 is transmission power required for a PUSCH having the greatest (highest quality required) MCS, for example, in the maximum transmission bandwidth assumed. This is set in advance at mobile station 100 by base station 200. By this means, when equation 5 is satisfied, even when a PUSCH and a PUCCH are FDM transmitted, it is possible to prevent transmission power of mobile station 100 from exceeding the maximum transmission power (P_max).

$$\text{PHR\_pucch} > X1 \text{ [dBm]} \qquad \text{(Equation 5)}$$

Further, in the FDM transmission mode, trigger information is reported when equation 6 is satisfied. Y1 is set as the same value as X1, for example. By this means, when equation 6 is satisfied, even when a PUSCH and a PUCCH are FDM transmitted, it is possible to prevent transmission power of mobile station 100 from exceeding maximum transmission power (P_max).

$$\text{PHR\_pucch} < Y1 \text{ [dBm]} \qquad \text{(Equation 6)}$$

Further, it is possible to set Y1 as a different value from X1. When Y1 and X1 are the same value, reports of trigger information occur frequently at mobile station 100 having the PHR_pucch that moves up and down around the threshold value. By making a difference between Y1 and X1, it is possible to prevent the above-described frequent reports of trigger information.

Further, trigger information to be reported can be PHR_pucch itself, or flag information of one bit showing whether PHR_pucch is greater or smaller than a threshold value. In the case where PHR_pucch is set as trigger information, although the amount of signaling increases, by reporting PHR_pucch correctly, base station 200 can switch the transmission mode more correctly and control the transmission bandwidth and MCS of a PUSCH. On the other hand, in the case where flag information of one bit is set as trigger information, although switch control of the transmission mode becomes less accurate, it is possible to reduce signaling overhead. Here, by controlling the transmission bandwidth and MCS of a PUSCH within the range assumed upon setting X1 or Y1, it is possible to prevent transmission power of a mobile station from exceeding the maximum transmission power, even after switch of the transmission mode.

Next, transmission mode control section 210 shown in FIG. 8 will be described in detail below. Transmission mode control section 210 determines to switch the method of multiplexing data (PUSCH) and control information (PUCCH) that are to be transmitted next time by mobile station 100, using the trigger information reported from mobile station 100.

Specifically, in the case where mobile station 100 is in the TDM transmission mode, when base station 200 obtains trigger information reported from mobile station 100 by satisfying equation 5, transmission mode control section 210 appropriately switches the transmission mode of mobile station 100 from the TDM transmission mode to the FDM transmission mode. In the condition where base station 100 reports trigger information in the TDM transmission mode, even when the transmission mode is switched to the FDM transmission mode, it is possible to prevent transmission power of mobile station 100 from exceeding the maximum transmission power (P_max).

Further, in the case where mobile station 100 is in the FDM transmission mode, when base station 200 obtains trigger information reported from mobile station 100 by satisfying equation 6, transmission mode control section 210 appropriately switches the transmission mode of mobile station 100 from the FDM transmission mode to the TDM transmission mode. In the condition where mobile station 100 reports trigger information in the FDM transmission mode, by switching the transmission mode to the TDM transmission mode, it is possible to prevent transmission power of mobile station 100 from exceeding the maximum transmission power (P_max).

Next, the cycle in which mobile station 100 reports PHR_pusch, will be described below. First, because the uses of PHR_pusch and PHR_pucch are different, by reporting PHR_pusch or PHR_pucch according to the frequency and accuracy corresponding to the use, it is possible to suppress increase of signaling overhead and appropriately switch the transmission mode at the same time.

As the use of PHR_pusch, PHR_pusch is used to control the transmission bandwidth and MCS of a PUSCH so that transmission power does not exceed the maximum transmission power of mobile station 100. On the other hand, as the use of PHR_pucch, PHR_pucch is used to determine to switch the transmission mode (TDM transmission mode or FDM transmission mode). Because the transmission bandwidth and MCS of a PUCCH are fixed, it is not necessary to control the transmission band and the MCS unlike a PUSCH.

Therefore, it is not necessary to report PHR_pucch that is used to switch the transmission mode as frequently and accurately as PHR_pusch. Only when mobile station 100 can switch the transmission mode or needs to switch the transmission mode, base station 200 can switch the transmission mode appropriately by reporting PHR_pucch to base station 200.

Figure 4:
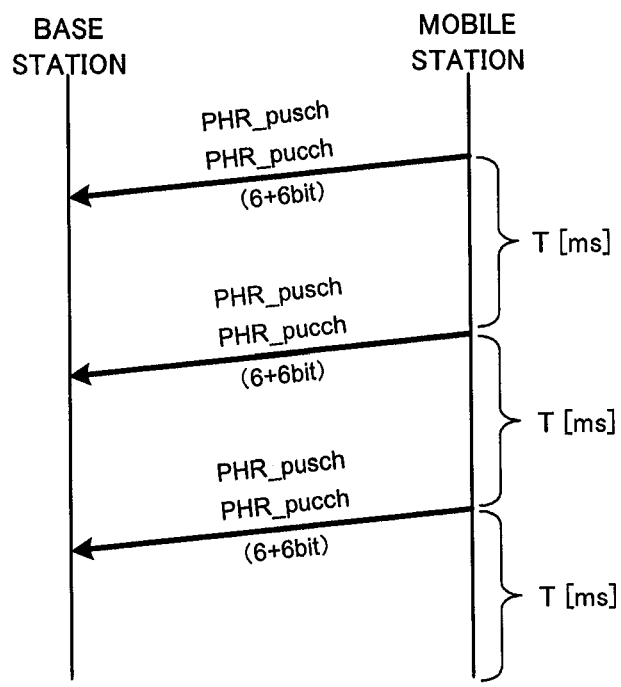
FIG. 4 shows a condition where signaling overhead is increasing.
Figure 11:
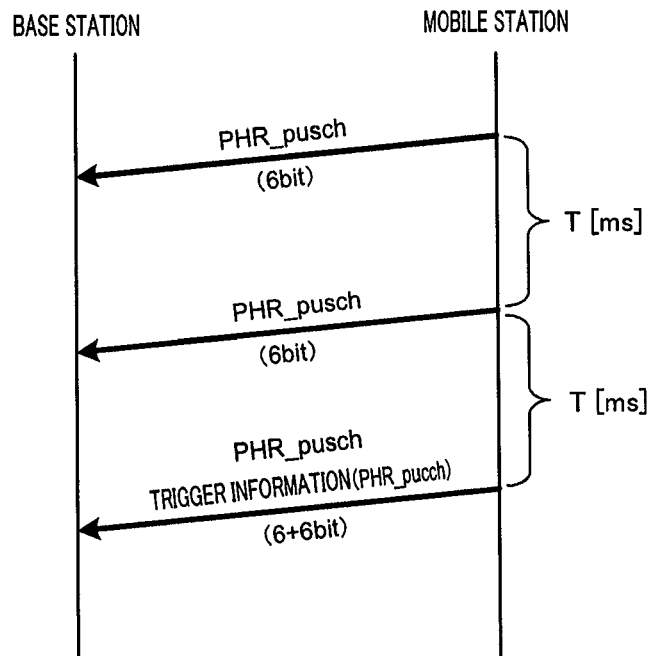
FIG. 11 is a sequence diagram showing a condition where the mobile station shown in FIG. 5 transmits PHR_pusch and trigger information (PHR_pucch) to the base station shown in FIG. 8.

FIG. 11 is a sequence diagram showing a condition where mobile station 100 shown in FIG. 5 transmits PHR_pusch and trigger information (PHR_pucch) to base station 200 shown in FIG. 8. Base station 200 can know information about PHR_pucch of mobile station 100 from trigger information, so that, in the TDM transmission mode, transmission power of mobile station 100 does not exceed the maximum power, making it possible to switch the transmission mode to the FDM transmission mode appropriately. Further, in the FDM transmission mode, it is possible to switch the transmission mode to the TDM transmission mode appropriately, before transmission power of mobile station 100 exceeds the maximum power. Compared to FIG. 4, it is clear that increase of signaling overhead is suppressed. As described above, by reporting trigger information only when it is possible or necessary to switch the transmission mode, it is possible to suppress increase of signaling overhead.

Figure 12:
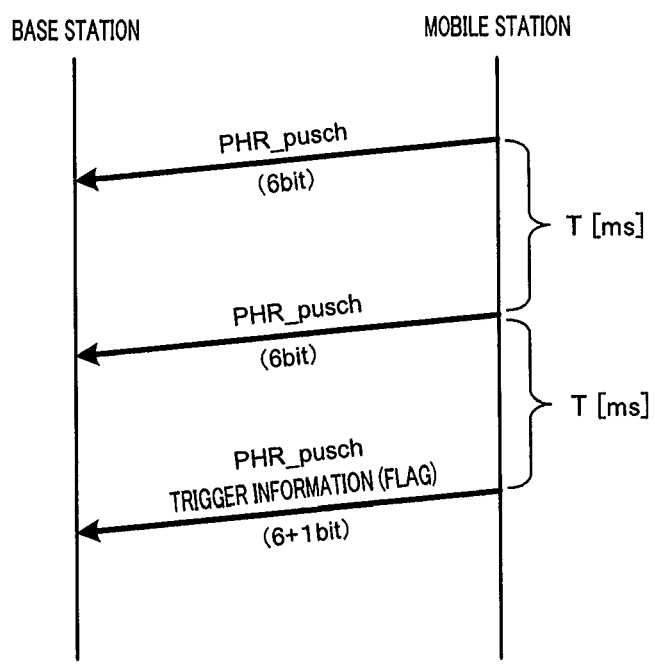
FIG. 12 is a sequence diagram showing a case where trigger information shown in FIG. 11 is flag information of one bit showing the result of comparison with a threshold value.

Further, FIG. 12 is a sequence diagram showing a case where trigger information shown in FIG. 11 is flag information of one bit showing the result of comparison with a threshold value. As shown in this figure, by setting trigger information as flag information of one bit showing the result of comparison with a threshold value, although switch control of the transmission mode becomes less accurate compared to the case where trigger information is PHR_pucch, it is possible to further suppress increase of signaling overhead.

As described above, according to Embodiment 1, by performing comparison with a threshold value by changing the condition of the comparison with a threshold value of PHR_pucch of a mobile station, according to the TDM transmission mode or the FDM transmission mode, which are methods of multiplexing a PUSCH and a PUCCH adopted by the mobile station, and reporting trigger information that induces switch between the TDM transmission mode and the FDM transmission mode from the mobile station to a base station according to the result of the comparison with a threshold value, it is possible to suppress increase of signaling overhead and correctly switch the transmission mode.

Here, in the conditional expressions of equation 5 and equation 6, it is possible to use PHR_pucch+pucch (PHR calculated based on transmission power required when a data channel and a control channel are FDM transmitted, as a reference) defined in following equation 7, instead of PHR_pucch.

$$\text{PHR\_pusch+pucch} = P\text{max} - (P\text{pusch} + P\text{pucch}) \quad \text{(Equation 7)}$$

Because it is possible to estimate PHR_pucch from the two pieces of PHR information of PHR_pusch+pucch and PHR_pusch, it is possible to obtain an equivalent effect to the case of reporting PHR_pucch.

Here, in the case of using PHR_pusch+pucch, it is necessary to use a different threshold value from the threshold values of equation 5 and equation 6 that use PHR_pucch. That is, in the TDM transmission mode, comparison with a threshold value is performed based on following equation 8, and in the FDM transmission mode, comparison with a threshold value is performed based on following equation 9.

$$\text{PHR\_pusch+pucch} > X2[\text{dBm}] \quad \text{(Equation 8)}$$

$$\text{PHR\_pusch+pucch} < Y2[\text{dBm}] \quad \text{(Equation 9)}$$

X2 of equation 8 needs to be set as a greater value than X1 of equation 5. For example, X2 is set as a value that is determined by adding transmission power required for a PUSCH having the maximum transmission bandwidth that can be assumed for X1. Further, Y2 of equation 9 needs to be set as a greater value than Y1 of equation 6.

Although it is possible to set the same value for X2 and Y2, by setting a difference between X2 and Y2 to set different values, as is the case with the above-described relationship between X1 and Y1, a mobile station having the PHR_pusch+pucch that moves up and down around the threshold value can prevent frequent reports of trigger information.

Figure 13:
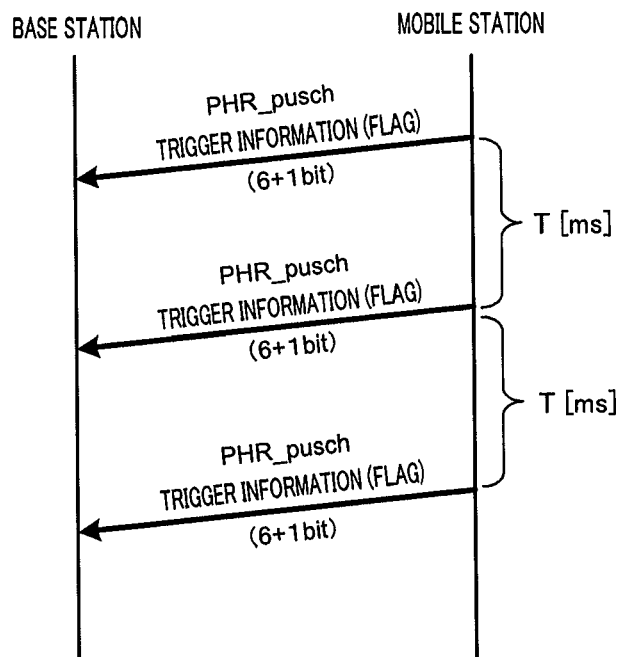
FIG. 13 is a sequence diagram showing a condition where PHR_pusch and trigger information, which is flag information of one bit, are reported.

As shown in the sequence diagram of FIG. 13, regarding the condition in which trigger information report determination section 108 reports trigger information, it is possible to set trigger information to output as flag information of one bit showing the result of comparison with a threshold value, as is the case with conventional PHR_pusch. Compared to FIG. 4, it is clear that increase of signaling overhead is suppressed. Further, because the number of signaling bits is constantly the same (constantly seven bits in the figure), it is possible to use one signaling transmission format, making it possible to simplify processing of a mobile station and a base station.

Embodiment 2

Figure 14:
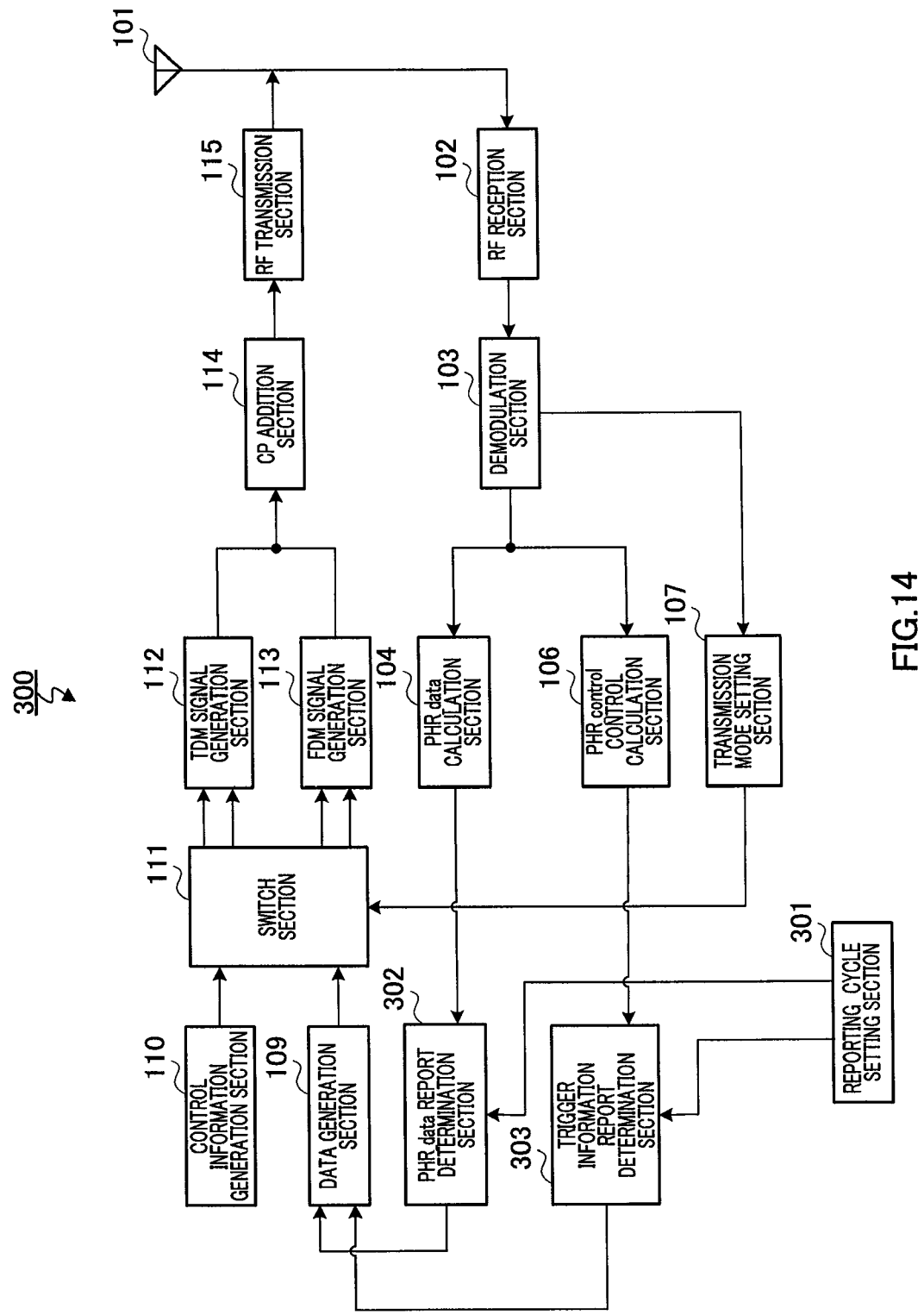
FIG. 14 is a block diagram showing a configuration of a mobile station according to Embodiment 2 of the present invention.

FIG. 14 is a block diagram showing a configuration of mobile station 300 according to Embodiment 2 of the present invention. FIG. 14 differs from FIG. 5 in that reporting cycle setting section 301 is added, PHR_data report determination section 105 is changed to PHR_data report determination section 302, and trigger information report determination section 108 is changed to trigger information report determination section 303.

Reporting cycle setting section 301 sets a reporting cycle of PHR_pusch and a reporting cycle of trigger information so that the reporting cycle of trigger information is longer than the reporting cycle of PHR_pusch, and outputs the set reporting cycle of PHR_pusch to PHR_data report determination section 302 and outputs the reporting cycle of trigger information to trigger information report determination section 303.

PHR_data report determination section 302 outputs PHR_pusch to data generation section 109, in the cycle output from reporting cycle setting section 301.

Trigger information report determination section 303 outputs trigger information to data generation section 109, in the cycle output from reporting cycle setting section 301.

Here, the reason reporting cycle setting section 301 sets the reporting cycle of trigger information (PHR_pucch) longer than the reporting cycle of PHR_pusch, will be described below. Trigger information (PHR_pucch) used for switch of the transmission mode does not need to be reported as frequently and accurately as PHR_pusch used for fine-tuned control such as link adaptation, so that the reporting cycle of trigger information is set longer than the reporting cycle of PHR_pusch.

For example, in the case where the reporting cycle of PHR_pusch is T [ms], the reporting cycle of trigger information is set as N×T [ms] (here, N is a natural number). N is a parameter set per cell or per mobile station, and is reported from base station 200 to mobile station 300.

Methods of setting N include the following method. In a cell having a large cell radius, because path loss increases, PHR of mobile station 300 located at the cell edge is small, so that it is necessary to switch the transmission mode. On the other hand, in a cell having a small cell radius, it is rare that mobile station 300 needs to switch the transmission mode. Therefore, by setting N greater for a cell of a smaller cell radius so as to set the reporting cycle of PHR_pucch longer, it is possible to switch the transmission mode appropriately with a small amount of signaling.

Figure 15:
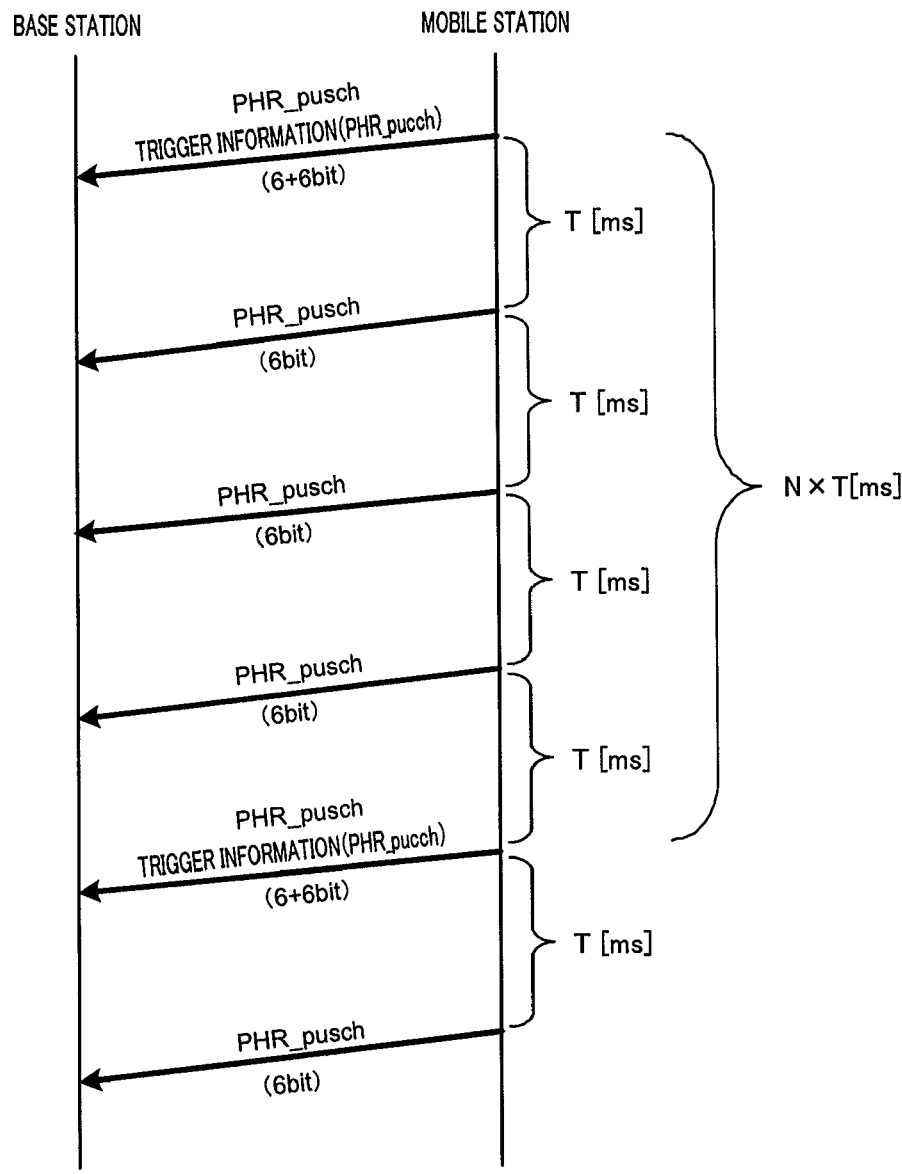
FIG. 15 is a sequence diagram showing a condition where the mobile station shown in FIG. 14 transmits PHR_pusch and trigger information (PHR_pucch) to the base station shown in FIG. 8.

FIG. 15 is a sequence diagram showing a condition where mobile station 300 shown in FIG. 14 transmits PHR_pusch and trigger information (PHR_pucch) to base station 200 shown in FIG. 8. As is clear from FIG. 15, because trigger information (PHR_pucch) is reported in a long cycle, it is possible to suppress increase of signaling overhead.

As described above, according to Embodiment 2, by setting the reporting cycle of trigger information (PHR_pucch) longer than the reporting cycle of PHR_pusch, trigger information (PHR_pucch) is reported in a long cycle, making it possible to suppress increase of signaling overhead.

Embodiment 3

Figure 16:
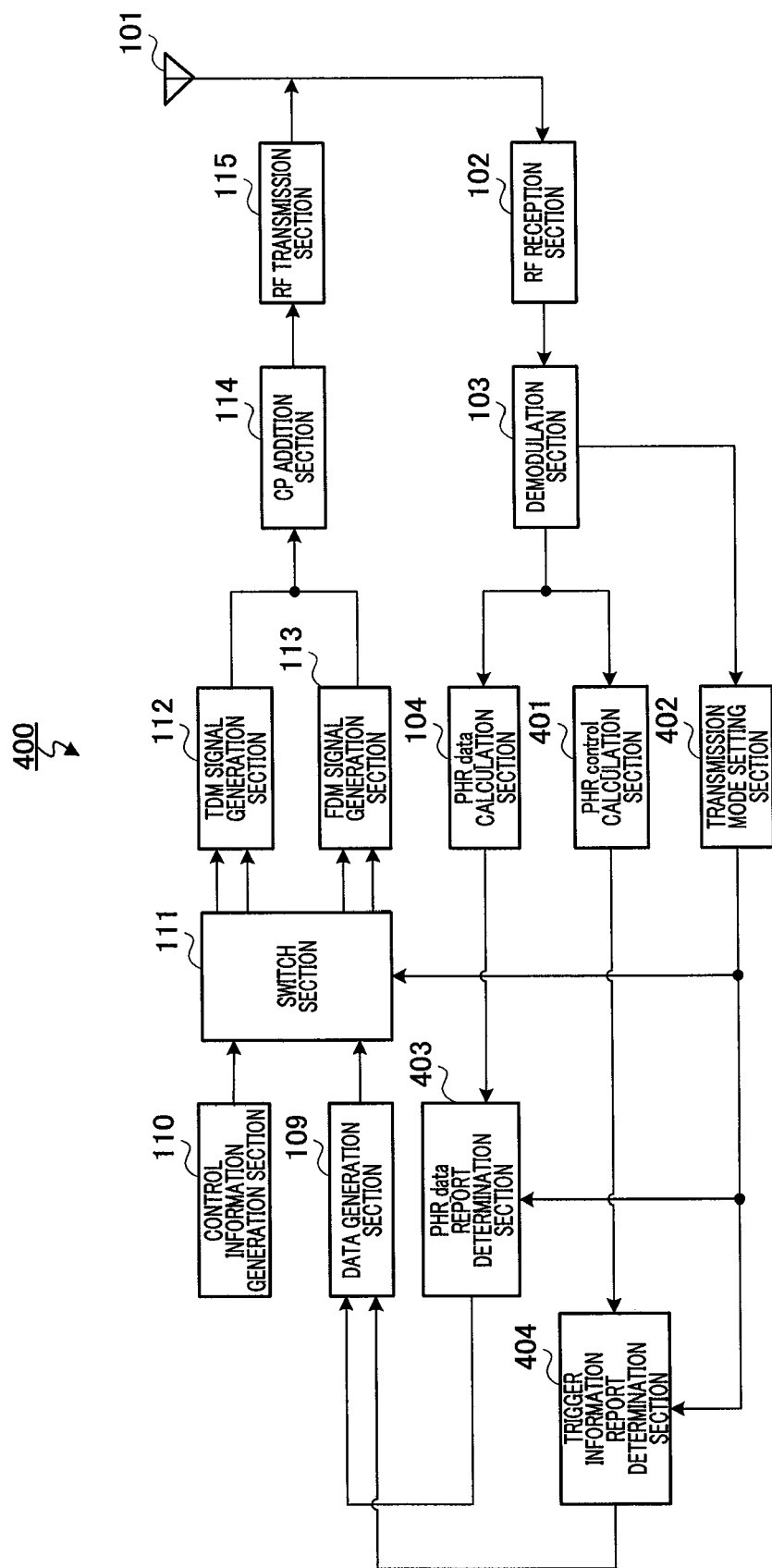
FIG. 16 is a block diagram showing a configuration of a mobile station according to Embodiment 3 of the present invention.

FIG. 16 is a block diagram showing a configuration of mobile station 400 according to Embodiment 3 of the present invention. FIG. 16 differs from FIG. 5 in that PHR_control calculation section 106 is changed to PHR_control calculation section 401, transmission mode setting section 107 is changed to transmission mode setting section 402, PHR_data report determination section 105 is changed to PHR_data report determination section 403, and trigger information report determination section 108 is changed to trigger information report determination section 404.

PHR_control calculation section 401 calculates PHR_pusch+pucch (PHR calculated based on transmission power required when a data channel and a control channel are FDM transmitted, as a reference) and PHR_pucch, based on a path loss level measured using a downlink pilot signal output from demodulation section 103, and the number of frequency resource blocks of a PUSCH, the MCS, power control information of a PUSCH, and power control information of a PUCCH that are contained in the scheduling information output from demodulation section 103, and outputs the calculated PHR_pusch+pucch and PHR_pucch to trigger information report determination section 404.

Transmission mode setting section 402 detects a command of a method of multiplexing a PUSCH and a PUCCH (TDM transmission mode or FDM transmission mode) that is contained in the scheduling information output from demodulation section 103, and outputs the result of the determination to trigger information report determination section 404, switch section 111, and PHR_data report determination section 403.

In the case where mobile station 400 is in the FDM transmission mode, PHR_data report determination section 403 does not report PHR_pusch. On the other hand, mobile station 400 is in the TDM transmission mode, PHR_data report determination section 403 reports PHR_pusch output from PHR_data calculation section 104 to base station 200, based on predetermined cycle T [ms] determined by base station 200 in advance.

In the case where mobile station 400 is in the FDM transmission mode, trigger information report determination section 404 determines to report PHR_pusch+pucch output from PHR_control calculation section 401, based on cycle T [ms] determined by base station 200 in advance. In the case where mobile station 400 is in the TDM transmission mode, in the same way as in Embodiment 1, trigger information report determination section 404 performs comparison with a threshold value by comparing the PHR_pucch output from PHR_control calculation section 401 with a predetermined threshold value, and, based on the result of the comparison with the threshold value, determines whether or not to report trigger information.

As described above, in the FDM transmission mode, PHR_data report determination section 403 stops outputting the PHR_pusch, and trigger information report determination section 404 reports PHR_pusch+pucch as trigger information.

In the FDM transmission mode, if base station 200 can know PHR_pusch+pucch, base station 200 can know the amount of transmission power of mobile station 400 that can be increased, so that it is possible to control the transmission bandwidth and MCS of a PUSCH. Further, in the case where PHR_pusch+pucch becomes smaller (margin of transmission power is reduced), by changing the transmission mode to the TDM transmission mode, it is possible to control transmission power of mobile station 400 so as not to exceed the maximum transmission power.

By this way, in the FDM transmission mode, when a base station can know PHR_pusch+pucch, it is possible to control switch of the transmission mode, and control the transmission bandwidth and MCS of a PUSCH.

Figure 17:
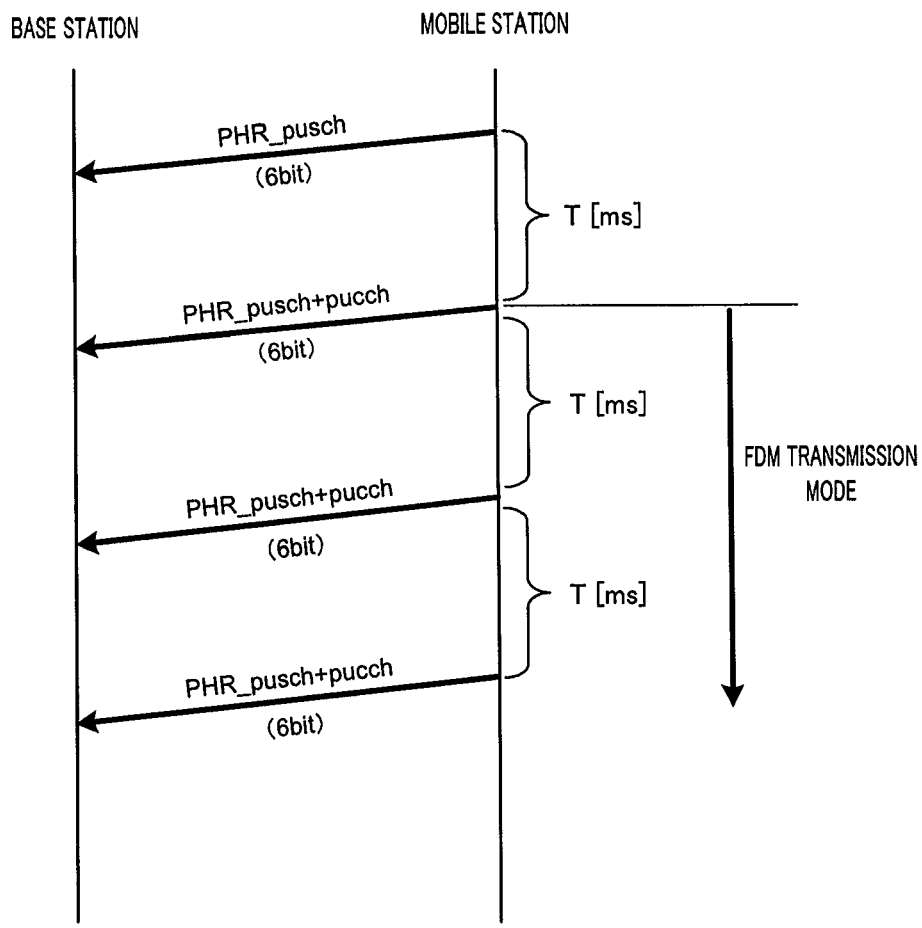
FIG. 17 is a sequence diagram showing a condition where the mobile station shown in FIG. 16 transmits PHR_pusch and trigger information (PHR_pusch+pucch) to the base station shown in FIG. 8.

FIG. 17 is a sequence diagram showing a condition where mobile station 400 shown in FIG. 16 transmits PHR_pusch and trigger information (PHR_pusch+pucch) to base station 200 shown in FIG. 8. As is clear from FIG. 17, in the FDM transmission mode, by stopping reporting of PHR_pusch, it is possible to suppress increase of signaling overhead.

As described above, according to Embodiment 3, in the FDM transmission mode, by reporting PHR_pusch+pucch as trigger information, a mobile station can suppress increase of signaling overhead.

In the case where the variable range of PHR to be reported for PHR_pusch+pucch is narrower compared to PHR_pusch, it is possible to reduce the number of signaling bits of PHR_pusch+pucch. For example, when the variable range of PHR is half, it is possible to reduce the number of signaling bits from six to three. By this means, it is possible to further suppress increase of signaling overhead.

On the other hand, when the numbers of signaling bits of PHR_pusch+pucch and PHR_pusch are set the same, it is possible to use one signaling transmission format. By this means, it is possible to simplify the processing of a mobile station or a base station.

In the case of calculating PHR_pusch+pucch, it is possible to perform calculation by adding the amount of increase of CM (=ACM) of the FDM transmission with respect to TDM transmission, as shown in following equation 10. By this means, it is possible to calculate PHR_pusch+pucch more accurately.

PHR_pusch+pucch=$P$max−($P$pusch+$P$pucch)−ΔCM  (Equation 10)

Further, instead of reporting PHR_pucch or PHR_pusch+pucch, it is possible to report a relative value with respect to PHR_pusch that is reported conventionally. By this means, it is possible to further reduce the amount of signaling.

Further, in the same way as PHR_pusch in LTE, in the case where PHR_pucch is reported as MAC information of a PUSCH, it is possible to calculate PHR_pucch based on the transmission power at the time of transmitting a PUCCH at the closest time.

Further, instead of PHR_pucch to be newly reported, it is possible to report information that can derive PHR_pucch (for example, g($\Delta_i$) of equation 4 (transmission power control value for which closed loop control is performed) or path loss (PL)).

Also, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of a programmable FPGA (field programmable gate array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

Although a case has been described with the above embodiment where the present invention is configured as an antenna, the present invention is also applicable to an antenna port.

The term, antenna port, refers to a theoretical antenna configured with one or a plurality of physical antennas. That is, an antenna port does not always refer to one physical antenna, and can also refer to, for example, an array antenna configured with a plurality of antennas.

For example, in 3GPP LTE, how many physical antennas an antenna port is configured with is not prescribed, and an antenna port is prescribed as a minimum unit by which a base station can transmit a different reference signal.

Further, an antenna port is also prescribed as a minimum unit with which the weight of precoding vector is multiplied.

The disclosure of Japanese Patent Application No. 2009-152647, filed on Jun. 26, 2009, including the specification, drawings and abstract, is incorporated herein by reference in its entirety.

INDUSTRIAL APPLICABILITY

A radio communication apparatus and a radio communication method are applicable to a mobile communication system, for example.

REFERENCE SIGNS LIST 101, 201 Antenna
102, 202 RF reception section
103 Demodulation section
104 PHR_data calculation section
105, 302, 403 PHR_data report determination section
106, 401 PHR_control calculation section
107, 402 Transmission mode setting section
108, 303, 404 Trigger information report determination section
109 Data generation section
110 Control information generation section
111, 204 Switch section
112 TDM signal generation section
113 FDM signal generation section
114 CP addition section 115, 212 RF transmission section
121 Multiplexing section
122, 131, 221, 231 DFT section
123, 132 Mapping section
124, 133, 224, 235 IDFT section
203 CP removal section
205 TDM signal demultiplexing section
206 FDM signal demultiplexing section
207 Control information decoding section
208 Data decoding section
209 Trigger information detection section
210 Transmission mode control section
211 Demodulation section
222, 232 Demapping section
223 Equalization section
225 Demultiplexing section
233 First equalization section
234 Second equalization section
301 Reporting cycle setting section

The invention claimed is:

1. A communication apparatus comprising:
circuitry, which, in operation, computes a power headroom (PHR), the PHR being obtained by subtracting a transmit power for a physical uplink shared channel (PUSCH) and a transmit power for a physical uplink control channel (PUCCH) from a maximum transmit power when the communication apparatus is configured to transmit the PUSCH simultaneously with the PUCCH; and
a transmitter, which, in operation, transmits the PHR.

2. The communication apparatus according to claim 1, wherein the circuitry, in operation, computes the PHR when the communication apparatus is configured to transmit the PUSCH and the PUCCH in a subframe.

3. The communication apparatus according to claim 1, wherein the circuitry, in operation, computes the PHR when the communication apparatus is configured to transmit the PUSCH and the PUCCH in different frequency bands of a subframe, respectively.

4. The communication apparatus according to claim 1, wherein the transmitter, in operation, transmits the PHR when the communication apparatus is configured to transmit the PUSCH simultaneously with the PUCCH.

5. The communication apparatus according to claim 1, wherein the transmitter, in operation, transmits the PHR when the communication apparatus is configured to transmit the PUSCH and the PUCCH in a subframe.

6. The communication apparatus according to claim 1, wherein the transmitter, in operation, transmits the PHR when the communication apparatus is configured to transmit the PUSCH and the PUCCH in different frequency bands of a subframe, respectively.

7. The communication apparatus according to claim 1, wherein the transmitter, in operation, transmits the PHR on a media access control (MAC) element in the PUSCH.

8. A communication method performed by a communication apparatus comprising:
computing a power headroom (PHR), the PHR being obtained by subtracting a transmit power for a physical uplink shared channel (PUSCH) and a transmit power for a physical uplink control channel (PUCCH) from a maximum transmit power when the communication apparatus is configured to transmit the PUSCH simultaneously with the PUCCH; and
transmitting the PHR.

9. The communication method according to claim 8, wherein the computing includes computing the PHR when the communication apparatus is configured to transmit the PUSCH and the PUCCH in a subframe.

10. The communication method according to claim 8, wherein the computing includes computing the PHR when the communication apparatus is configured to transmit the PUSCH and the PUCCH in different frequency bands of a subframe, respectively.

11. The communication method according to claim 8, wherein the transmitting includes transmitting the PHR when the communication apparatus is configured to transmit the PUSCH simultaneously with the PUCCH.

12. The communication method according to claim 8, wherein the transmitting includes transmitting the PHR when the communication apparatus is configured to transmit the PUSCH and the PUCCH in a subframe.

13. The communication method according to claim 8, wherein the transmitting includes transmitting the PHR when the communication apparatus is configured to transmit the PUSCH and the PUCCH in different frequency bands of a subframe, respectively.

14. The communication method according to claim 8, wherein the transmitting includes transmitting the PHR on a media access control (MAC) element in the PUSCH.

* * * * *